United States Patent
Yang (10) Patent No.: US 12,520,007 B2
(45) Date of Patent: Jan. 6, 2026

(54) DYNAMIC UTILIZATION OF SATELLITE SIGNAL METADATA TO CONTROL ERROR LOG TRACKING OF CONTENT RECEIVERS

(71) Applicant: DISH Network L.L.C., Englewood, CO (US)

(72) Inventor: Yunfeng Yang, Aurora, CO (US)

(73) Assignee: DISH NETWORK L.L.C., Englewood, CO (US)

(*) Notice: Subject to any disclaimer, the term of this patent is extended or adjusted under 35 U.S.C. 154(b) by 76 days.

(21) Appl. No.: 18/660,016

(22) Filed: May 9, 2024

(65) Prior Publication Data

US 2025/0350798 A1    Nov. 13, 2025

(51) Int. Cl.
*H04N 21/4425* (2011.01)
*H04N 21/433* (2011.01)
*H04N 21/61* (2011.01)

(52) U.S. Cl.
CPC ....... *H04N 21/4425* (2013.01); *H04N 21/433* (2013.01); *H04N 21/6143* (2013.01)

(58) Field of Classification Search
CPC ............ H04N 21/4425; H04N 21/433; H04N 21/6143
See application file for complete search history.

(56) References Cited

U.S. PATENT DOCUMENTS

| | | | | |
|---|---|---|---|---|
| 11,494,250 | B1* | 11/2022 | Chopra | G06F 11/302 |
| 2007/0192788 | A1* | 8/2007 | Danzl | H04N 21/6118 |
| | | | | 348/E5.006 |
| 2013/0054680 | A1* | 2/2013 | Nakano | G06F 11/3476 |
| | | | | 709/203 |
| 2014/0279918 | A1* | 9/2014 | Han | G06F 11/366 |
| | | | | 707/648 |
| 2017/0063762 | A1* | 3/2017 | Machol | H04L 51/56 |
| 2018/0217887 | A1* | 8/2018 | Rueger | G06F 11/0727 |
| 2020/0192778 | A1* | 6/2020 | Gao | G06F 11/3476 |
| 2021/0034497 | A1* | 2/2021 | Peterson | G06F 11/324 |
| 2021/0311817 | A1* | 10/2021 | Badiger | G06F 11/0715 |
| 2022/0308982 | A1* | 9/2022 | Ruan | G06F 11/3698 |
| 2022/0398151 | A1* | 12/2022 | Nandavar | G06F 11/0781 |
| 2023/0108359 | A1* | 4/2023 | Ganesan | G06F 11/3423 |
| | | | | 714/45 |
| 2024/0211337 | A1* | 6/2024 | Rani | G06F 11/079 |
| 2024/0364599 | A1* | 10/2024 | Post, Jr. | H04R 29/008 |

* cited by examiner

*Primary Examiner* — Yassin Alata
(74) *Attorney, Agent, or Firm* — Seed Intellectual Property Law Group LLP (57) ABSTRACT

Methods and systems for utilizing satellite signals to dynamically adjust how content receivers store log data to diagnose errors. A content distributor selects content receivers having at least one error in an error group and selects an error-logging level to diagnose the at least one error in the selected content receivers based on the error group. The content distributor selects a key-value pair for the error-logging level and generate metadata that identifies the selected content receivers and the key-value pair. The content distributor then transmits a satellite signal with the metadata to the selected content receivers. Each selected content receiver receives the satellite signal with the metadata. The content receivers extract the metadata from the satellite signal and determines the key-value pair from the extracted metadata. The content receivers then set the error-logging level based on the key-value pair and store logs of operational data based to the error-logging level.

20 Claims, 5 Drawing Sheets

DYNAMIC UTILIZATION OF SATELLITE SIGNAL METADATA TO CONTROL ERROR LOG TRACKING OF CONTENT RECEIVERS

BACKGROUND

Over the past few years, content receivers, such as set-top-boxes, have greatly improved the presentation of content to users, such as in how users interact with and view content. This improvement has been aided by the number of content channels that are available to watch at any given time, the quality of video output devices, and the quality of the input signal carrying the content. But from time to time, content receivers encounter errors that need to be fixed. Unfortunately, some errors are hard to diagnose and can require support from a technician. It is with respect to these and other considerations that the embodiments herein have been made.

BRIEF SUMMARY

Embodiments are generally directed to methods and systems for utilizing satellite signals to dynamically adjust how content receivers store log data to diagnose errors. A content distributor selects content receivers having at least one error and selects an error-logging level to diagnose the at least one error in the selected content receivers. In some embodiments, the content receivers are selected in response to those content receivers experiencing an error in an error group, such that the error-logging level is selected based on the error group. In various embodiments, the error-logging level is selected from a plurality of error-logging levels, wherein each error-logging level of the plurality of error-logging levels corresponds to a different set of operating parameters or an amount of data the one or more content receivers are to monitor. The content distributor selects a key-value pair for the error-logging level and generate metadata that identifies the selected content receivers and the key-value pair. The content distributor then transmits a satellite signal with the metadata to the selected content receivers.

Each selected content receiver receives the satellite signal with the metadata. The content receivers extract the metadata from the satellite signal and determines the key-value pair from the extracted metadata. The content receivers then set the error-logging level based on the key-value pair and store logs of operational data based to the error-logging level. In various embodiments, the content receivers modify a configuration or settings file to control or adjust the error-logging level being employed by the content receiver.

Using satellite signals to dynamically instruct content receivers to modify configuration or settings files that control how the content receivers are storing log data reduces the need to perform larger software updates on the content receivers. And because larger software updates are not needed, error-logging levels can be changes weekly, daily, or even hourly depending on the extent of the errors being observed and how quickly they can be resolved.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
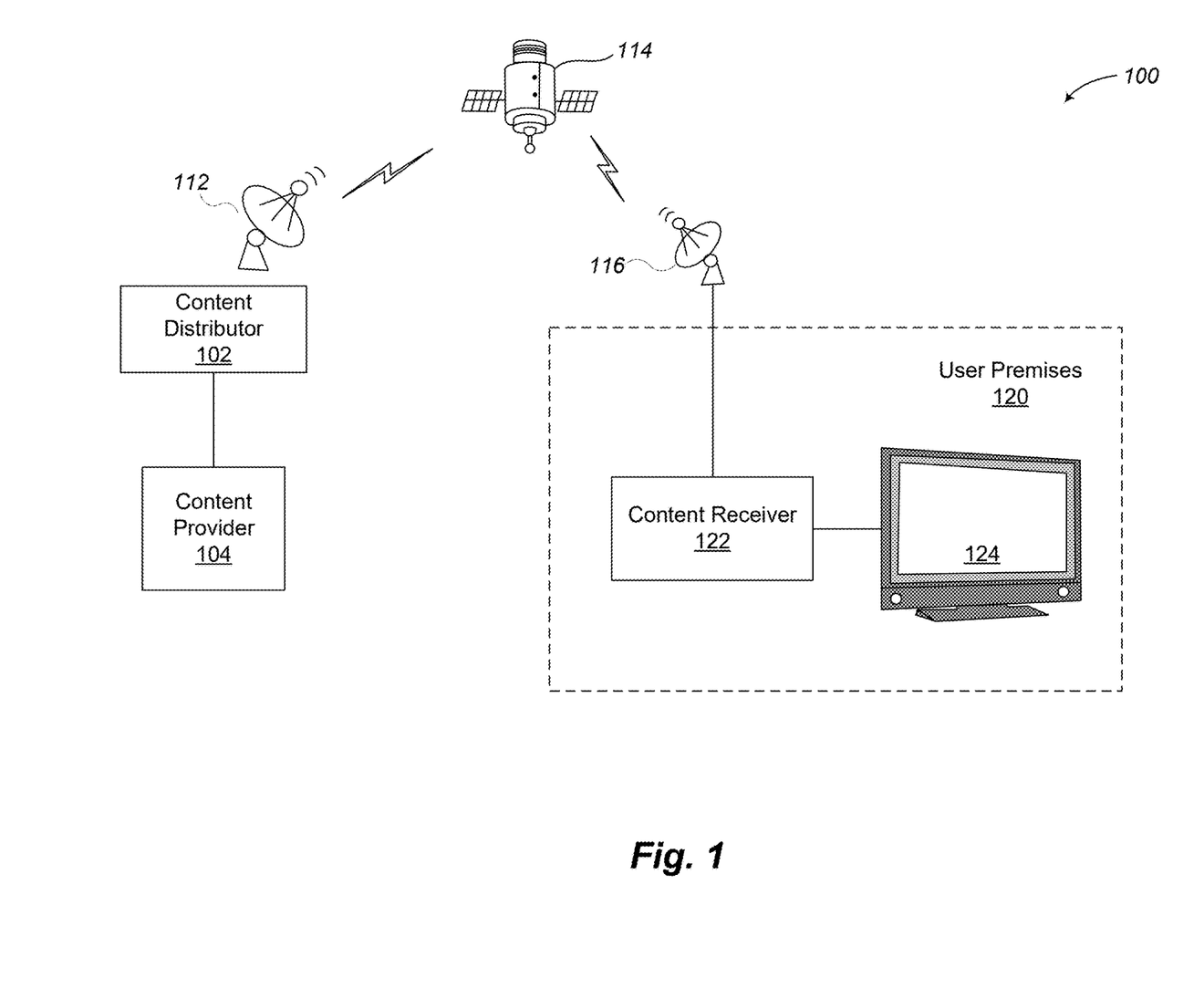
FIG. 1 illustrates a context diagram of an environment for utilizing satellite content signals to instruct content receivers to dynamically adjust their error-logging levels in accordance with embodiments described herein.

FIG. 1 illustrates a context diagram of an environment 100 for utilizing satellite content signals to instruct content receivers to dynamically adjust their error-logging levels in accordance with embodiments described herein. Environment 100 includes content providers 104, content distributor 102, and user premises 120.

The content distributor 102 is configured to receive content from one or more content providers 104 and provide that content to one or more content receivers 122 through satellite 114. The content distributor 102 is also configured to dynamically instruct the content receiver 122 to modify which error-logging level the content receiver 122 is to employ when trying to diagnose errors in the content receiver 122. As described herein, the content distributor 102 selects one or more content receivers 122 that are experiencing an error and the specific error-logging level that those selected content receivers are to employ. The content distributor 102 then generates the satellite signal to include error metadata that identifies the content receiver 122 and the specific error-logging level. The content distributor 102 sends the content, and the error metadata, through uplink 112, which goes to satellite 114 and back to downlink station 116 that may also include a head end (not shown). Accordingly, a satellite content signal or satellite signal is a carrier signal modulated to be transmitted to a satellite, such that the satellite broadcasts the signal to content receivers via a downlink station (also referred to as a satellite dish). The content, and the error metadata, is then sent to the content receiver 122 on user premises 120.

The content receiver 122 is a computing device that receives content via satellite 114 for presentation on the display device 124 to a user (also referred to as a viewer) on the user premises 120. Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device. Content includes audio, visual, or audiovisual content that is presented to a user via a content receiver. Examples of content include text, graphics, video, audio, or other information presented to the user, which may include, but is not limited to, television or radio programs, sports broadcasts, news feeds, advertisements, and other types of displayable or audible content.

The content receiver 122 is also configured to extract the error metadata from the satellite signal to determine if it is to dynamically adjust the error-logging level that it is employing to diagnose an error that the content receiver 122 is experiencing. Based on the error-logging level identified in the error metadata of the satellite signal, the content receiver 122 stores log data describing the operations or use of the content receiver 122, which can enable the content receiver 122 or a technician to diagnose and resolve the errors. If the error persists, the content distributor 102 can further adjust or increase the error-logging level being employed by the content receiver 122 through the use of the error metadata in other satellite signals. In various embodiments, the content receiver 122 can provide or report the stored logs back to the content distributor 102 via one or more wired or wireless networks (not illustrated).

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102.

Figure 2:
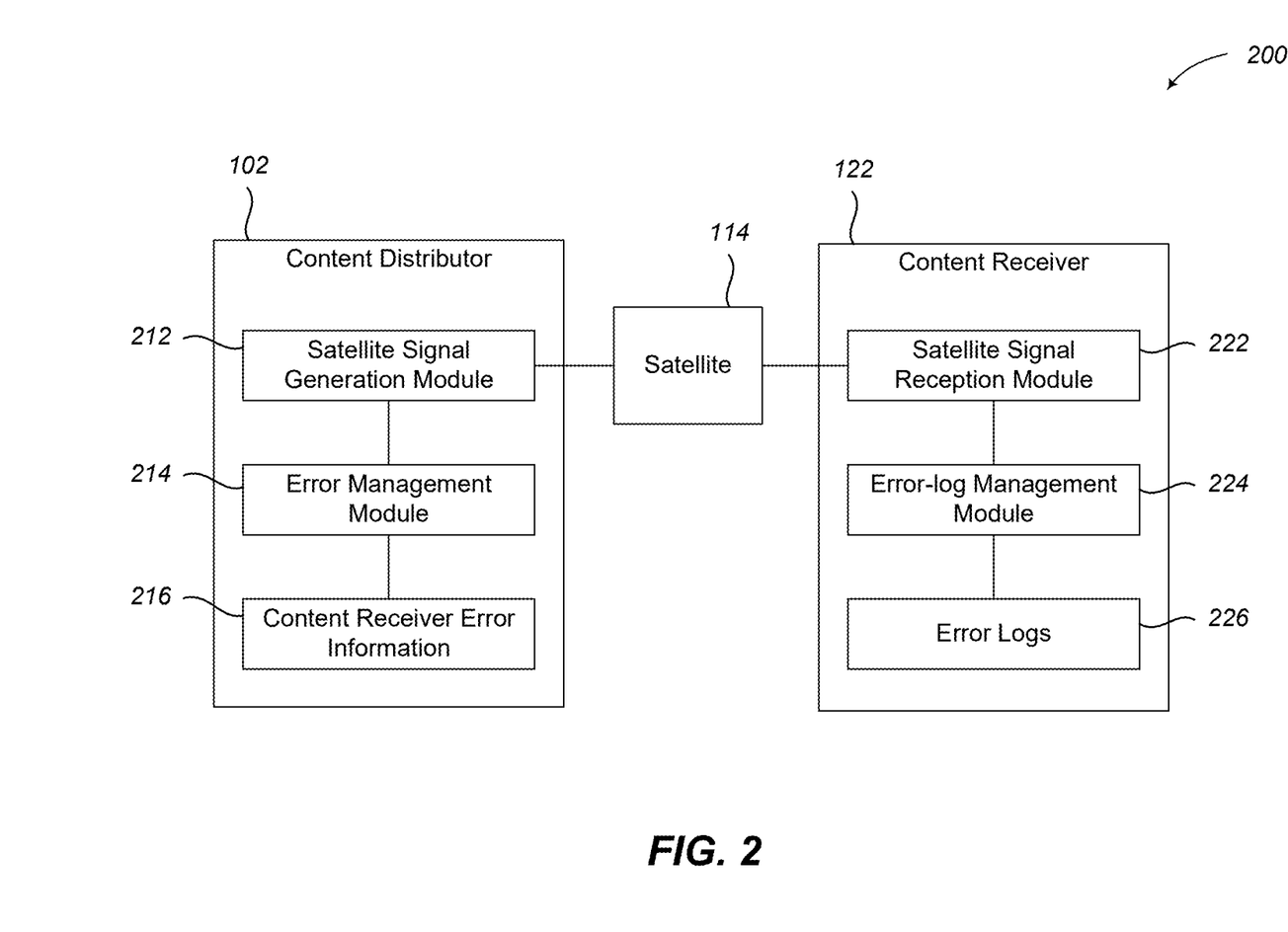
FIG. 2 is a context diagram of a non-limiting embodiment of systems for implementing satellite content signals to instruct content receivers to dynamically adjust their error-logging levels in accordance with embodiments described herein.

FIG. 2 is a context diagram of a non-limiting embodiment of systems 200 for implementing satellite content signals to instruct content receivers to dynamically adjust their error-logging levels in accordance with embodiments described herein. Systems 200 may include content distributor 102, satellite 114, and one or more content receivers 122, similar to what is shown and discussed in conjunction with FIG. 1.

The content distributor 102 is configured to dynamically instruct one or more of the content receivers 122 to modify which error-logging level the content receivers 122 are to employ when trying to diagnose errors in the content receivers 122, as described herein. The content distributor 102 may include a satellite signal generation module 212, an error management module 214, and content receiver error information 216.

The content receiver error information 216 may store or include information regarding one or more content receivers 122 that are having or experiencing one or more errors. This information may include details regarding the specific models or types of content receivers, the types of errors, locations of the content receivers, the current error-logging level being employed by content receivers, etc.

The error management module 214 is configured to use the content receiver error information 216 to determine which content receivers 122 are experiencing errors and to determine which error-logging level those content receivers 122 are to utilize. In some embodiments, the error management module 214 is configured to generate error metadata that identifies one or more selected content receivers that are to receive a change in their error-logging level and the specific error-logging level that they are to employ, as described herein.

The satellite signal generation module 212 is configured to receive the error metadata from the error management module 214 and generate a satellite signal that includes the error metadata. Once the satellite signal is generated, the satellite signal generation module causes the satellite signal, and the error metadata, to be transmitted to the content receiver 122 via the satellite 114.

Although the satellite signal generation module 212 and the error management module 214 are illustrated as two modules, embodiments are not so limited. Rather, the functionality of the satellite signal generation module 212 and the error management module 214 may be employed as a single module or as a plurality of modules.

The one or more content receivers 122 are configured to extract the error metadata from the satellite signal to determine if it is to dynamically adjust the error-logging level that it is employing to diagnose an error that the content receiver 122 is experiencing, as described herein. The content receivers 112 may include a satellite signal reception module 222, an error-log management module 224, and error logs 226.

The satellite signal reception module 222 is configured to receive the satellite signal from the satellite 114. In some embodiments, the satellite signal reception module 222 may extract the error metadata from the satellite signal and provide it to the error-log management module 224.

The error-log management module 224 may utilize the error metadata to determine if the content receiver 122 is to change its error-logging level, and if so to what level, which is defined in the error metadata. The error-log management module 224 may also be configured to monitor and obtain information pertaining to the operations of the content receiver 122, which is stored in the error logs 226.

Although the satellite signal reception module 222 and the error-log management module 224 are illustrated as two modules, embodiments are not so limited. Rather, the functionality of the satellite signal reception module 222 and the error-log management module 224 may be employed as a single module or as a plurality of modules.

The operation of certain aspects will now be described with respect to FIGS. 3 and 4.

Figure 3:
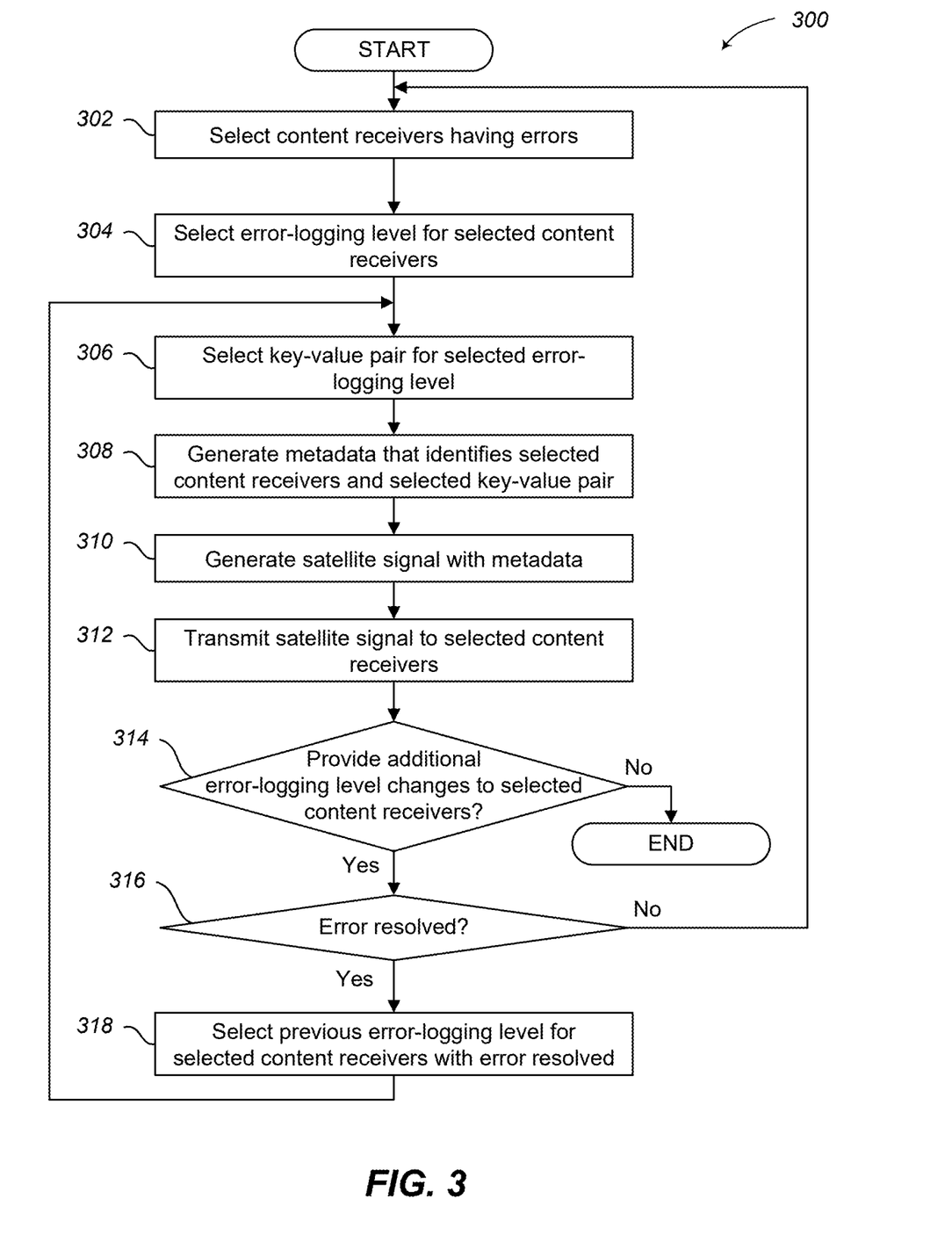
FIG. 3 illustrates a logical flow diagram showing one embodiment of a process for a content distributor to modify and transmit a satellite signal to instruct content receivers to dynamically adjust their error-logging levels in accordance with embodiments described herein.

FIG. 3 illustrates a logical flow diagram showing one embodiment of a process 300 for a content distributor to modify and transmit a satellite signal to instruct content receivers to dynamically adjust their error-logging levels in accordance with embodiments described herein. Process 300 may be implemented individually or collectively by one or more processors or executed individually or collectively via circuitry on one or more computing devices or systems, such as content distributor 102 in FIG. 1.

Process 300 begins, after a start block, at block 302, where one or more content receivers having or experiencing one or more errors are selected. The selected content receivers may be specific content receivers, a specific type (or types) of content receivers, specific model (or models) of content receivers, content receivers in a particular geographic area or in a particular market, content receivers having or experiencing a specific error (or errors), or content receivers that share some other characteristic, or some combination thereof.

In some embodiments, the content receivers may be experiencing one or more errors in an error group, where an error group represents modules or threads in a process that is executed by a content receiver and that could be experiencing an issue or problem. An error group may also represent operating parameters of the content receiver. In at least one such embodiment, a plurality of error groups may be defined or selected for different combinations of modules, threads, processes, or operating parameters executed by a content receiver. In this way, the content receivers may be selected based on the errors being associated with a same or similar error group.

In some embodiments, the selected content receivers may have previously reported the errors, such as by providing previously stored logs of content receiver operations indicating that the content receiver is experiencing an error. In other embodiments, an administrator may indicate that the one or more content receivers are having errors. For example, users of the content receivers may have contacted customer service representatives to report the errors and customer service representatives provide input to the system indicating which content receivers are experiencing errors.

Process 300 proceeds, after block 302, to block 304, where an error-logging level is selected for the selected content receivers. The error-logging level is selected from a plurality of error-logging levels, where each separate error-logging level indicates a type or how much log data each of the selected content receivers is to store. In some embodiments, the plurality of error-logging levels may be from level_0 to level_6. For example, level_0 may instruct the content receiver to only store major error information, level_1 may instruct the content receiver to store minor and major error information, level_2 may instruct the content receiver to store minor and major error information and on/off user commands, level_3 may instruct the content receiver to store minor and major error information and on/off user commands and user setting input commands, and so on. In this way, the additional data or types of data can be used (e.g., by a technician or automated error diagnostic system) to diagnose and correct the errors being experienced by the selected content receivers.

In various embodiments, the error-logging level is selected based on the error group associated with the errors of the selected content receivers. In at least one embodiment, different error groups may be associated with different error-logging levels. In this way, different types or amounts of data can be collected based on different types of errors.

Process 300 continues, after block 304, at block 306, where a key-value pair is selected for the selected error-logging level. The key-value pair is a combination of information that instructs the selected content receivers to adjust or modify one or more of its operating characteristics in a specific manner. The operating characteristics are functions, actions, settings, or configurations that can be performed or modified by a content receiver. Examples of operating characteristics may include, but are not limited to, setting error-logging levels (e.g., setting a specifically selected error-logging level to be used by the content receiver), turning HDMI on/off (e.g., turning on or off HDMI channels on the content receiver), resetting the content receiver (e.g., instructing the content receiver to reset itself), installing a software update (e.g., installing a specific software update), etc. Accordingly, each of a plurality of keys corresponds to a separate operating characteristic of a content receiver that can be modified, and each key is associated with a plurality of values that separately define or correspond to a separate property of that operating characteristic that can be modified.

In various embodiments, the key that corresponds to the operating characteristic for setting error-logging levels is selected from the plurality of keys, and the value that corresponds to the specifically selected error-logging level is selected from the plurality of values that are associated with the selected key. As one example, the key instructs the selected content receivers to update a configuration file defining how the selected content receivers store the logs of content receiver operations, and the value is the update to the configuration file. Although embodiments are described as selecting and using key-value pairs to instruct the selected content receivers to employ a specific error-logging level, embodiments are not so limited. In other embodiments, other flags, tags, or information may be used to identify the specific error-logging level that the content receivers are to employ. Moreover, other key-value pairs may also be selected or used to instruct the selected content receivers to modify other operating characteristics or to perform other actions.

Process 300 proceeds, after block 306, to block 308, where error metadata is generated that identifies the selected content receivers and the selected key-value pair. The metadata may include tags, values, or other information indicating which content receivers are the selected content receivers and the specifically selected key-value pair. As one illustrative example, the metadata may include "model_ABC; error-1". In this example, the selected content receivers are all model_ABC content receivers, and the key-value pair is "error-1," where "error" is the key indicating that the selected content receivers are to set their error-logging level and "1" is the value indicating that the specific error-logging level to be used is level_1.

In some embodiments, the metadata may also include timing conditions or parameters for the selected content receivers. In at least one such embodiment, the timing conditions instruct the selected content receivers to monitor and store logging information pursuant to the selected error-logging level for a selected duration or period of time, or until a threshold amount of data is stored. The timing conditions may also instruct the selected content receivers to report the stored logs at a selected time, such as after the selected duration or period of time, after the threshold amount of data is stored, or until a selected time or date.

In various embodiments, the timing conditions or parameters may be selected based on the selected error-logging level. For example, the timing conditions may instruct the selected content receivers to store 500 MB of data if the error-logging level is level_0, but store 1 GB of data if the error-logging level is level_2. Once a selected content receiver meets or satisfies the timing condition, then that selected content receiver can report, forward, or provide its stored log data to another computing device, such as content distributor 102 in FIG. 1.

In some embodiments, the metadata, or additional metadata, may also be generated to include other key-value pairs to instruct the selected content receivers to modify other operating characteristics or to perform other actions.

Process 300 continues, after block 308, at block 310, where a satellite signal is generated with the error metadata. In various embodiments, the satellite signal is a satellite orbital television signal that is transmitted or broadcast from a satellite to a satellite antenna that is electrically coupled to a content receiver. The satellite signal may also be referred to as an orbital signal, which may include one or more satellite signals (e.g., a multiplexed or otherwise combined data stream or signal). Satellite signals may include audiovisual content, metadata, encoding or decoding information, encryption information, or other information. In some embodiments, the satellite signal is generated to only include the metadata. In other embodiments, the satellite signal is generated to include a combination of audiovisual content and the metadata.

Process 300 proceeds, after block 310, to block 312, where the satellite signal with the metadata is transmitted or broadcast to the selected content receivers. In various embodiments, the satellite signal is transmitted or broadcast to a geographic area without specifically targeting the selected content receivers. Individual content receivers then analyze the satellite signal and its metadata to determine if they are one of the selected content receivers, which is discussed in further detail in conjunction with process 400 in FIG. 4.

Process 300 continues, after block 312, at decision block 314, where a determination is made whether additional error-logging level changes are to be provided to the selected content receivers. As noted above, the content receivers store logs of operations and other data pursuant to the error-logging level that was identified by the key-value pair in the metadata of the satellite signal. If the errors being experienced by the selected content receivers have been resolved and the error-logging level is to be restored or changed to a reduced or default error-logging level, or if the errors persist and the error-logging level is to be increased, then process 300 flows to decision block 316. But if the errors being experienced by the selected content receivers have been resolved and the error-logging level has already been restored to a reduced or default error-logging level (e.g., by process 300 looping from block 318 to block 308), then process 300 may terminate or otherwise return to a calling process to perform other actions.

At decision block 316, a determination is made whether the error has been resolved for one or more of the selected content receivers. In some embodiments, the selected content receivers may have reported the errors have been resolved, such as by providing the stored logs of content receiver operations, which may indicate that the error has been resolved. In other embodiments, an administrator may indicate that one or more selected content receivers are no longer having errors. For example, one or more technicians may provide input to the system indicating that the errors of one or more selected content receivers have been resolved or are no longer occurring.

If the error is resolved for one or more content receivers, then process 300 flows from decision block 316 to block 318, where a previous or default error-logging level is selected for those content receivers having the resolved error. For example, if the current error-logging level is level_2, but the error has been resolved, then a previous error-logging level of level_0 may be selected. After block 318, process 300 loops to block 306, where a new key-value pair is selected for the reduced or default error-logging level, and new metadata is generated for the new key-value pair. In this way, a new satellite signal with the new metadata is generated and transmitted to the selected content receivers where the errors have been resolved.

But if the error is continuing and an increased error-logging level is to be provided to one or more selected content receivers, then process 300 loops from decision block 316 to block 302 to select those specific content receivers still having the errors. In this way, an increased error-logging level is selected (e.g., going from level_1 to level_2), a new key-value pair is selected for the increased error-logging level, new metadata is generated for the new key-value pair, and a new satellite signal with the new metadata is generated and transmitted to the selected content receivers where the errors persist.

The looping of process 300 allows for the system to use satellite signals to instruct content receivers to dynamically change the error-logging level that they are using over time until errors are resolved.

Figure 4:
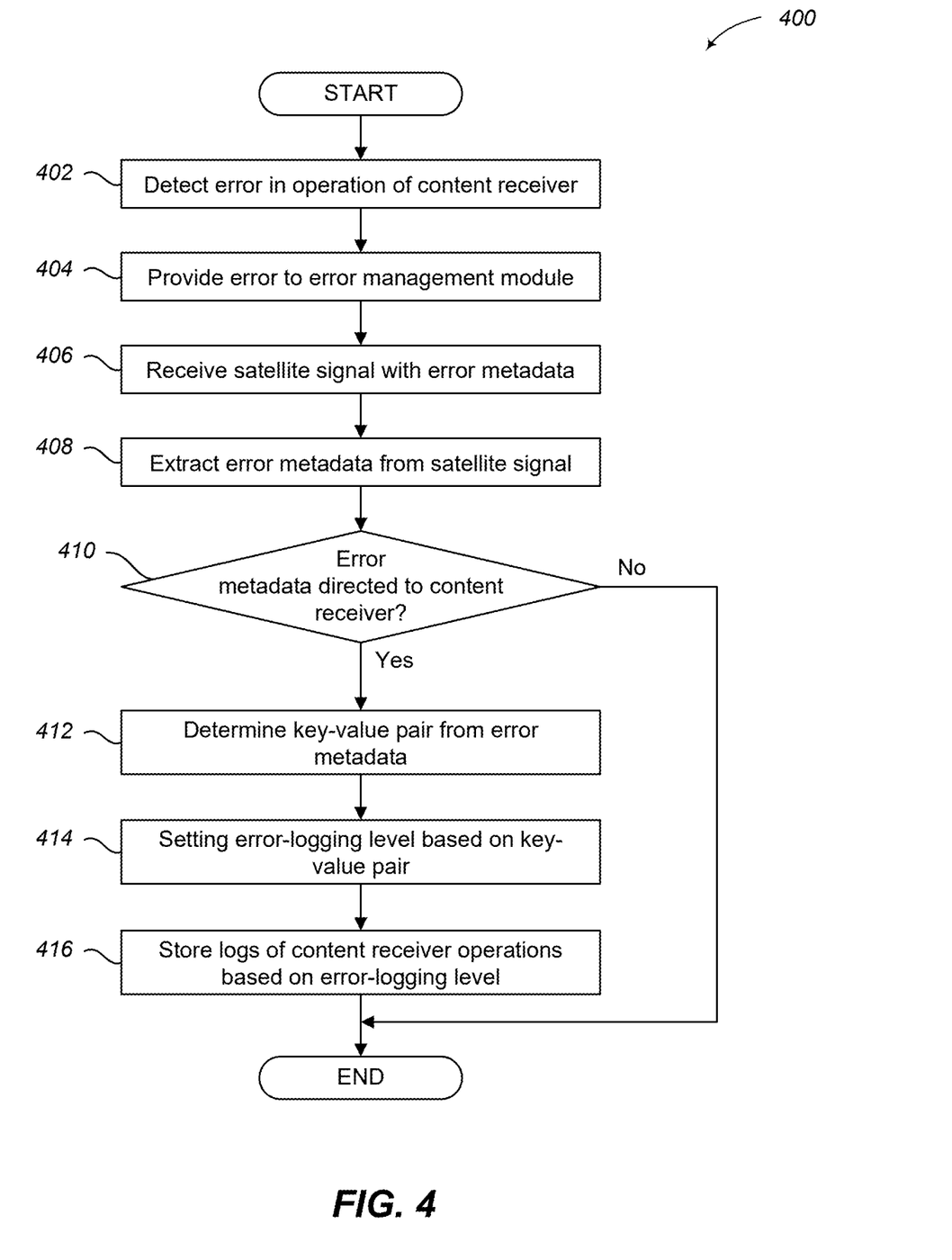
FIG. 4 illustrates a logical flow diagram showing one embodiment of a process for a content receiver to adjust its error-logging levels based on information contained in a satellite content signal in accordance with embodiments described herein.

FIG. 4 illustrates a logical flow diagram showing one embodiment of a process 400 for a content receiver to adjust its error-logging levels based on information contained in a satellite content signal in accordance with embodiments described herein. Process 400 may be implemented individually or collectively by one or more processors or executed individually or collectively via circuitry on one or more computing devices, such as content receiver 122 in FIG. 1.

Process 400 begins, after a start block, at block 402, where an error is detected in the operation of the content receiver. In some embodiments, the content receiver may explicitly detect that an error has occurred. In other embodiments, the content receiver may store logs of content receiver operations, which can implicitly indicate that an error has occurred.

Process 400 proceeds, after block 402, to block 404, where the error is provided to an error management module, such as error management module 214 of content distributor 102 in FIG. 2. In some embodiments, the content receiver may provide its error logs periodically; or in response to a request, such as from an administrator or technician; or in response to detection of an error.

In some embodiments, block 402 and block 404 may be optional and may not be performed, such as where a user of a content receiver contacts a customer service representative to report the error or if the content receiver is not experiencing an error.

Process 400 continues, after block 404, at block 406, where a satellite signal with error metadata is received. As described herein, the content distributor generates the satellite signal to include metadata that identifies selected content receivers that are experiencing errors and includes a key-value pair (or other information) indicating that those selected content receivers are to set their error-logging level to a selected level.

Process 400 proceeds, after block 406, to block 408, where the error metadata is extracted from the satellite signal. In some embodiments, the content receiver separates the error metadata from other portions of the satellite signal, such as the audiovisual content that the content receiver is to display to a user. In other embodiments, the content receiver reads or interprets the error metadata from the satellite without explicitly separating it from other portions of the satellite signal.

Process 400 continues, after block 408, at decision block 410, where a determination is made whether the error metadata is directed to the content receiver that is performing process 400. In various embodiments, information regarding the content receiver that received the satellite signal is compared to the error metadata to determine if the content receiver is a selected content receiver identified in process 300 in FIG. 3. For example, if the error metadata indicates that the selected content receivers in which the error metadata is directed are content receivers of model_ABC, then the content receiver determines if it is also model_ABC. If the error metadata is directed to the content receiver that is performing process 400, then process 400 flows to block 412; otherwise, the content receiver can ignore the error metadata and process 400 terminates or otherwise returns to a calling process to perform other actions (e.g., displaying or presenting audiovisual content from the satellite signal to a user).

At block 412, a key-value pair is determined from the error metadata. As described herein, the key-value pair provides instructions to the content receiver indicating how the content receiver is to set a specifically selected error-logging level. For example, the key is extracted from the key-value pair to determine that the content receiver is to set or update the error-logging level a configuration or settings file. And the value is extracted from the key-value pair to identify the specific error-logging level that the content receiver is to employ.

Process 400 proceeds, after block 412, to block 414, where the error-logging level is set based on the key-value pair. In various embodiments, the content receiver sets or updates a configuration or settings file with the specific error-logging level defined by the key-value pair.

Process 400 continues, after block 414, at block 416, where the content receiver stores logs of content receiver operations based on the error-logging level. For example, if the error-logging level is level_0, then the content receiver only stores major error information. But if the error-logging level is level_1, then the content receiver stores minor and major error information. The content receiver stores additional data if the corresponding error-logging level is set.

As described herein the error metadata may also include timing conditions or parameters. If the error metadata also includes a timing condition, then the content receiver can report or forward the stored logs in accordance with the timing condition that is extracted from the error metadata in the satellite signal.

After block 416, process 400 terminates or otherwise returns to a calling process to perform other actions (e.g., displaying or presenting audiovisual content from the satellite signal to a user).

Figure 5:
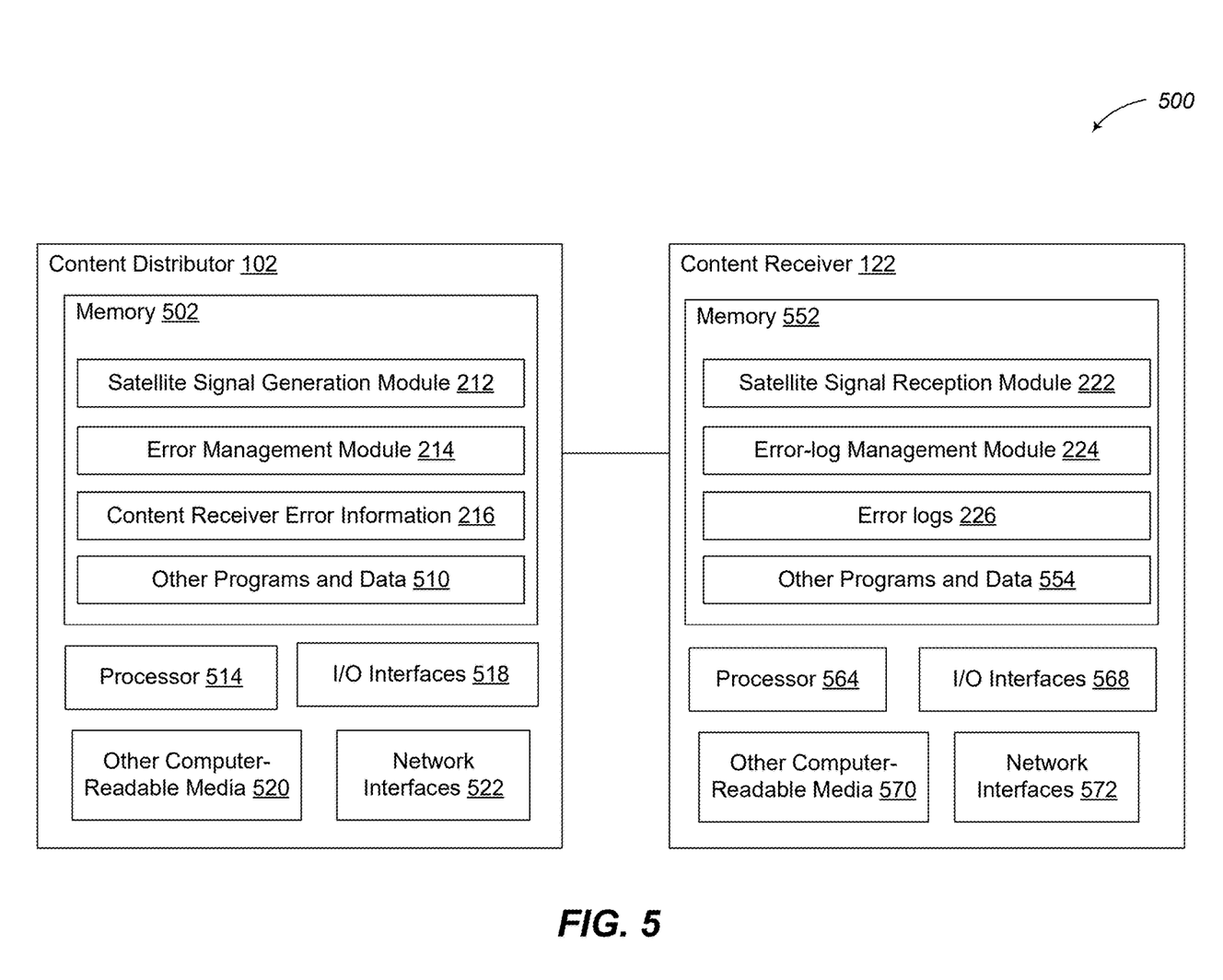
FIG. 5 shows a system diagram that describes one implementation of computing systems for implementing embodiments described herein.

FIG. 5 shows a system diagram that describes one implementation of computing systems for implementing embodiments described herein. System 500 includes content receiver 122 and content distributor 102, similar to what is described above in conjunction with FIGS. 1 and 2.

As described herein, the content distributor 102 is a computing device or computing system that can perform functionality described herein for dynamically instructing content receivers 122 to adjusting the error-logging level being employed to diagnose errors in those content receivers, as described herein. One or more special purpose computing systems may be used to implement the content distributor 102. Accordingly, various embodiments described herein may be implemented in software, hardware, firmware, or in some combination thereof. The content distributor 102 includes memory 502, processor 514, network interface 522, input/output (I/O) interfaces 518, and other computer-readable media 520.

Processor 514 includes one or more processors, one or more processing units, programmable logic, circuitry, or one or more other computing components that are configured to perform embodiments described herein or to execute computer instructions to perform embodiments described herein. In some embodiments, a processor system may include a single processor 514 that operates individually to perform actions. In other embodiments, a processor system may include a plurality of processors 514 that operate to collectively perform actions, such that one or more processors 514 may operate to perform some, but not all, of such actions. Reference herein to "a processor system" of the content distributor 102 refers to one or more processors 514 that individually or collectively perform actions of the content distributor 102. And reference herein to "the processor system" of the content distributor 102 refers 1) a subset or all of the one or more processors 514 comprised by "a processor system" of the content distributor 102 and 2) any combination of the one or more processors 514 comprised by "a processor system" of the content distributor 102 and one or more other processors 514 of the content distributor 102.

Memory 502 may include one or more various types of non-volatile or volatile storage technologies. Examples of memory 502 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 502 may be utilized to store information, including computer-readable instructions that are utilized by a processor system of the content distributor 102 to perform actions, including at least some embodiments described herein.

Memory 502 may have stored thereon satellite signal generation module 212, error management module 214, and content receiver error information 216, which are described in more detail herein. Memory 502 may also store other programs and data 510, such as operating systems, administrative applications, or other computer programs.

Network interface 522 is configured to communicate with other computing devices, such as to transmit satellite signals or to receive error logs from content receivers. I/O interfaces 518 may include interfaces for various other input or output devices, such as USB interfaces, physical buttons, keyboards, haptic interfaces, tactile interfaces, or the like. Other computer-readable media 520 may include other types of stationary or removable computer-readable media, such as removable flash drives, external hard drives, or the like.

As described herein, the content receiver 122 is a computing device or computing system that can perform functionality described herein for dynamically adjusting its error-logging level from information contained within a satellite signal, as described herein. One or more special purpose computing systems may be used to implement the content receiver 122. Accordingly, various embodiments described herein may be implemented in software, hardware, firmware, or in some combination thereof. The content receiver 122 includes memory 552, processor 564, network interface 572, input/output (I/O) interfaces 568, and other computer-readable media 570.

Processor 564 includes one or more processors, one or more processing units, programmable logic, circuitry, or one or more other computing components that are configured to perform embodiments described herein or to execute computer instructions to perform embodiments described herein. In some embodiments, a processor system may include a single processor 564 that operates individually to perform actions. In other embodiments, a processor system may include a plurality of processors 564 that operate to collectively perform actions, such that one or more processors 564 may operate to perform some, but not all, of such actions. Reference herein to "a processor system" of the content receiver 122 refers to one or more processors 564 that individually or collectively perform actions of the content receiver 122. And reference herein to "the processor system" of the content receiver 122 refers 1) a subset or all of the one or more processors 564 comprised by "a processor system" of the content receiver 122 and 2) any combination of the one or more processors 564 comprised by "a processor system" of the content receiver 122 and one or more other processors 564 of the content receiver 122.

Memory 552 may include one or more various types of non-volatile or volatile storage technologies. Examples of memory 552 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 552 may be utilized to store information, including computer-readable instructions that are utilized by a processor system of the content receiver 122 to perform actions, including at least some embodiments described herein.

Memory 552 may have stored thereon satellite signal reception module 222, error-log management module 224, and error logs 226, which are described in more detail herein. Memory 552 may also store other programs and data 554, such as operating systems, user applications, or other computer programs.

Network interface 572 is configured to communicate with other computing devices, such as to receive satellite signals or to transmit error logs to content distributor 102. I/O interfaces 568 may include interfaces for various other input or output devices, such as USB interfaces, physical buttons, keyboards, haptic interfaces, tactile interfaces, or the like.

Other computer-readable media 570 may include other types of stationary or removable computer-readable media, such as removable flash drives, external hard drives, or the like.

The following is a summarization of the claims as originally filed.

A first method performed by a content distributor computing system may be summarized as comprising: selecting one or more content receivers having at least one error associated with an error group; selecting an error-logging level for the one or more content receivers to use based on the error group; selecting a key-value pair, wherein the key corresponds to an operating characteristic of the one or more content receivers for setting error-logging levels and the value corresponds to error-logging level; generating metadata that identifies the one or more content receivers and the key-value pair; and transmitting a satellite signal with the metadata to the one or more content receivers to cause the one or more content receivers to use the key-value pair from the metadata to set the error-logging level and to store logs of content receiver operations based to the error-logging level.

The first method may select the error-logging level by: selecting the error-logging level from a plurality of error-logging levels, wherein each error-logging level of the plurality of error-logging levels corresponds to a different set of operating parameters the one or more content receivers are to monitor.

The first method may select the error-logging level by: selecting the error-logging level from a plurality of error-logging levels, wherein each error-logging level of the plurality of error-logging levels corresponds to separate types of operating data that the one or more content receivers are to store.

The first method may generate the metadata by: generating the metadata to identify the one or more content receivers, the key-value pair, and a second key-value pair that corresponds to a second operating characteristic for the one or more content receivers to modify.

The first method may further comprise: obtaining at least one previous log file from each corresponding content receiver of the one or more content receivers indicating that the corresponding content receivers is experiencing the at least one error.

The first method may generate the metadata further by: determining a timing condition identifying when the one or more content receivers are to report the stored logs of content receiver operations; and modifying the metadata to include the timing condition.

The first method may further comprise: receiving an indication that the at least one error is not resolved for at least one content receiver of the one or more content receivers; selecting an increased error-logging level to further diagnose the at least one error in the at least one content receiver; selecting a second key-value pair for the increased error-logging level; generating second metadata that identifies the at least one content receiver and the selected second key-value pair; and transmitting a second satellite signal with the second metadata to the at least one content receiver to cause the at least one content receiver to use the second key-value pair from the second metadata to set the increased error-logging level and to store additional logs of content receiver operations based to the increased error-logging level.

The first method may further comprise: receiving an indication that the at least one error is resolved for the one or more content receivers; selecting a reduced error-logging level; selecting a second key-value pair for the reduced error-logging level; generating second metadata that identifies the at least one content receiver and the selected second key-value pair; and transmitting a second satellite signal with the second metadata to the at least one content receiver to cause the at least one content receiver to use the second key-value pair from the second metadata to set the reduced error-logging level and to store additional logs of content receiver operations based to the reduced error-logging level.

A second method performed by a content receiver may be summarized as comprising: receiving a satellite signal with metadata that identifies content receivers having at least one error and a key-value pair; extracting the metadata from the satellite signal; determining the key-value pair from the extracted metadata; setting an error-logging level based on the key-value pair; and storing logs of operations of the content receiver based to the error-logging level.

The second method may set the error-logging level by: identifying the error-logging level from a plurality of error-logging levels based on the key-value pair, wherein each error-logging level of the plurality of error-logging levels corresponds to a different set of operating parameters the one or more content receivers are to monitor.

The second method may select the error-logging level by: identifying the error-logging level from a plurality of error-logging levels based on the key-value pair, wherein each error-logging level of the plurality of error-logging levels corresponds to separate types of operating data that the one or more content receivers are to store.

The second method may determine the key-value pair from the extracted metadata by: obtaining a key instructing the content receiver to update a configuration file defining how the content receiver is to store the logs of operations; and obtaining a value for the error-logging level the content receiver is to employ.

The second method may further comprise: providing at least one previous log file indicating that the content receiver is experiencing the at least one error.

The second method may further comprise: extracting a timing condition from the metadata, wherein the timing condition identifies when the content receiver is to report the stored logs of operations.

The second method may further comprise: receiving a second satellite signal with second metadata that includes a second key-value pair; extracting the second metadata from the second satellite signal; determining the second key-value pair from the extracted second metadata; setting a second error-logging level based on the second key-value pair; and storing additional logs of operations of the content receiver based to the second error-logging level.

The second method may set the second error-logging level by: setting an increased error-logging level based on the content receiver continuing to experience at least one error.

The second method may set the second error-logging level by: setting a reduced error-logging level based on the at least one error being resolved.

A system may be summarized as comprising: a content distributor computing system and a content receiver. The content distributor computing system may comprise: a first memory configured to store first computer instructions; and a first processor system configured to execute the first computer instructions to: select an error-logging level to diagnose at least one error in one or more content receivers; select a key-value pair for the error-logging level; generate metadata that identifies the one or more content receivers and the key-value pair; and broadcast a satellite signal with metadata that identifies the one or more content receivers and the key-value pair. The content receiver may comprise: a second memory configured to store second computer instructions; and a second processor system configured to execute the second computer instructions to: receive the satellite signal; extract the metadata from the satellite signal; determine the key-value pair from the extracted metadata; set the error-logging level based on the key-value pair; and store logs of operations of the content receiver based to the error-logging level.

The first processor system of the content distributor computing system may be configured to further execute the first computer instructions to: receive at least one previous log file from the content receiver indicating that the content receiver is experiencing the at least one error.

The second processor system of the content receiver may be configured to further execute the second computer instructions to: extract a timing condition from the metadata from the satellite signal; and report the stored logs of operations to the content distributor computing system based on the timing condition.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a content distributor computing system, comprising:
   selecting one or more content receivers having at least one error associated with an error group;
   selecting an error-logging level for the one or more content receivers to use based on the error group;
   selecting a key-value pair, wherein the key corresponds to an operating characteristic of the one or more content receivers for setting error-logging levels and the value corresponds to the error-logging level;
   generating metadata that identifies the one or more content receivers and the key-value pair; and
   transmitting a satellite signal with the metadata to the one or more content receivers to cause the one or more content receivers to use the key-value pair from the metadata to set the error-logging level and to store logs of content receiver operations based to the error-logging level.

2. The method of claim 1, wherein selecting the error-logging level comprises:
   selecting the error-logging level from a plurality of error-logging levels, wherein each error-logging level of the plurality of error-logging levels corresponds to a different set of operating parameters the one or more content receivers are to monitor.

3. The method of claim 1, wherein selecting the error-logging level comprises:
   selecting the error-logging level from a plurality of error-logging levels, wherein each error-logging level of the plurality of error-logging levels corresponds to separate types of operating data that the one or more content receivers are to store.

4. The method of claim 1, wherein generating the metadata comprises:
   generating the metadata to identify the one or more content receivers, the key-value pair, and a second key-value pair that corresponds to a second operating characteristic for the one or more content receivers to modify.

5. The method of claim 1, further comprising:
obtaining at least one previous log file from each corresponding content receiver of the one or more content receivers indicating that the corresponding content receiver is experiencing the at least one error.

6. The method of claim 1, wherein generating the metadata further comprises:
determining a timing condition identifying when the one or more content receivers are to report the stored logs of content receiver operations; and
modifying the metadata to include the timing condition.

7. The method of claim 1, further comprising:
receiving an indication that the at least one error is not resolved for at least one content receiver of the one or more content receivers;
selecting an increased error-logging level to further diagnose the at least one error in the at least one content receiver;
selecting a second key-value pair for the increased error-logging level;
generating second metadata that identifies the at least one content receiver and the selected second key-value pair; and
transmitting a second satellite signal with the second metadata to the at least one content receiver to cause the at least one content receiver to use the second key-value pair from the second metadata to set the increased error-logging level and to store additional logs of content receiver operations based to the increased error-logging level.

8. The method of claim 1, further comprising:
receiving an indication that the at least one error is resolved for the one or more content receivers;
selecting a reduced error-logging level;
selecting a second key-value pair for the reduced error-logging level;
generating second metadata that identifies the at least one content receiver and the selected second key-value pair; and
transmitting a second satellite signal with the second metadata to the at least one content receiver to cause the at least one content receiver to use the second key-value pair from the second metadata to set the reduced error-logging level and to store additional logs of content receiver operations based to the reduced error-logging level.

9. A method performed by a content receiver, comprising:
receiving a satellite signal with metadata that identifies content receivers having at least one error and a key-value pair;
extracting the metadata from the satellite signal;
determining the key-value pair from the extracted metadata;
setting an error-logging level based on the key-value pair; and
storing logs of operations of the content receiver based to the error-logging level.

10. The method of claim 9, wherein setting the error-logging level comprises:
identifying the error-logging level from a plurality of error-logging levels based on the key-value pair, wherein each error-logging level of the plurality of error-logging levels corresponds to a different set of operating parameters the one or more content receivers are to monitor.

11. The method of claim 9, wherein selecting the error-logging level comprises:
identifying the error-logging level from a plurality of error-logging levels based on the key-value pair, wherein each error-logging level of the plurality of error-logging levels corresponds to separate types of operating data that the one or more content receivers are to store.

12. The method of claim 9, wherein determining the key-value pair from the extracted metadata comprises:
obtaining a key instructing the content receiver to update a configuration file defining how the content receiver is to store the logs of operations; and
obtaining a value for the error-logging level the content receiver is to employ.

13. The method of claim 9, further comprising:
providing at least one previous log file indicating that the content receiver is experiencing the at least one error.

14. The method of claim 9, further comprising:
extracting a timing condition from the metadata, wherein the timing condition identifies when the content receiver is to report the stored logs of operations.

15. The method of claim 9, further comprising:
receiving a second satellite signal with second metadata that includes a second key-value pair;
extracting the second metadata from the second satellite signal;
determining the second key-value pair from the extracted second metadata;
setting a second error-logging level based on the second key-value pair; and
storing additional logs of operations of the content receiver based to the second error-logging level.

16. The method of claim 15, wherein setting the second error-logging level comprises:
setting an increased error-logging level based on the content receiver continuing to experience at least one error.

17. The method of claim 15, wherein setting the second error-logging level comprises:
setting a reduced error-logging level based on the at least one error being resolved.

18. A system, comprising:
a content distributor computing system, comprising:
a first memory configured to store first computer instructions; and
a first processor system configured to execute the first computer instructions to:
select an error-logging level to diagnose at least one error in one or more content receivers;
select a key-value pair for the error-logging level;
generate metadata that identifies the one or more content receivers and the key-value pair; and
broadcast a satellite signal with metadata that identifies the one or more content receivers and the key-value pair; and
a content receiver of the one or more content receivers, comprising:
a second memory configured to store second computer instructions; and
a second processor system configured to execute the second computer instructions to:
receive the satellite signal;
extract the metadata from the satellite signal;

determine the key-value pair from the extracted metadata;

set the error-logging level based on the key-value pair; and store logs of operations of the content receiver based to the error-logging level.

19. The system of claim 18, wherein the first processor system is configured to further execute the first computer instructions to:

receive at least one previous log file from the content receiver indicating that the content receiver is experiencing the at least one error.

20. The system of claim 18, wherein the second processor system is configured to further execute the second computer instructions to:

extract a timing condition from the metadata from the satellite signal; and report the stored logs of operations to the content distributor computing system based on the timing condition.

\* \* \* \* \*